Aug. 12, 1930.  E. J. VAUDREUIL  1,772,971
HULLING APPARATUS
Filed Nov. 24, 1928
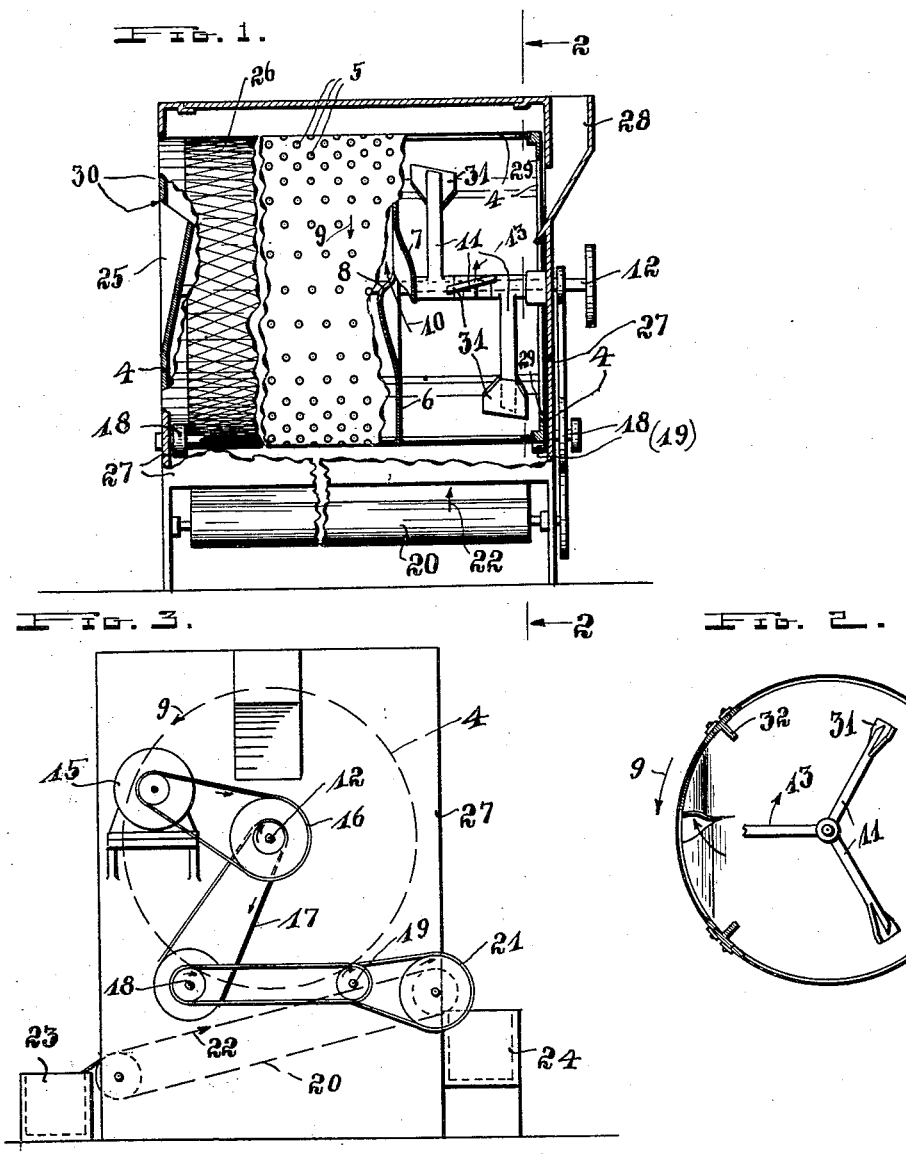
INVENTOR:
EDWARD J. VAUDREUIL,
By: [signature]
his Atty.

Patented Aug. 12, 1930

1,772,971

UNITED STATES PATENT OFFICE

EDWARD J. VAUDREUIL, OF LOS ANGELES, CALIFORNIA, ASSIGNOR TO MODERN DEVICES, INCORPORATED, OF NEW YORK, N. Y., A CORPORATION OF DELAWARE

HULLING APPARATUS

Application filed November 24, 1928. Serial No. 321,701.

This invention relates to an apparatus used for hulling vegetables, such as peas and beans.

One of the objects of this invention is to provide an apparatus of a simple compact structure that can easily be handled by anyone not particularly skilled with the machine and that can easily be placed in a comparatively small room.

Another object is to provide an apparatus which will deliver peas hulled and cleaned of any undesired matter at one side, while discharging the hulls and all other waste matter at other points.

Another object is to provide a sectioned drum in which partitions have comparatively small communicating passages by which vegetables or other objects will be transferred from one section or compartment to the next section or compartment gradually in small quantities.

Another object is to provide a screened drum to rotate slowly in one direction, having a threshing mechanism rotating comparatively at a great velocity in the opposite direction.

Another object is to provide a conveyer below the screened drum in an inclined plane traveling upwardly so that any waste matter will be carried upwardly on account of the natural rough or unround condition of such waste material while allowing the comparatively round or smooth vegetables or fruit to roll on the conveyer downwardly into a suitable receptacle for the clean vegetables or fruit.

Another object is to provide separate discharging means in the drum for waste material.

Other objects will appear from the following description and appended claims as well as from the accompanying drawing, in which—

Fig. 1 is a fragmentary front elevation partly cut away to show inside working parts of a simple hulling apparatus arranged to clean and hull vegetables and other objects according to this invention.

Fig. 2 is a cross-section through the rotating drum on line 2—2 of Fig. 1.

Fig. 3 is an end elevation of Fig. 1 illustrating somewhat diagrammatically the operating mechanism and connections of the several rotating shafts for the hulling apparatus.

As illustrated, a drum 4 serves to receive and hold vegetables or fruit for the hulling process. This drum is provided with a multitude of apertures 5 of a size that vegetables or fruit, such as peas or beans, will easily fall out of the drum though the hulls and other waste material will be retained inside of the drum. The drum is provided with a number of partitions 6 whereby a suitable number of sections or compartments are arranged inside of the drum, the various sections having communicating passages of comparatively small size, the partitions being cut and bent so as to form deflecting vanes 7 and 8, so that, while the drum travels in the direction of the arrow 9, material may be directed from one section into the other in the direction of the arrow 10.

Beating or threshing arms 11 are provided on a central shaft 12 to rotate in the direction of the arrow 13, the shaft being directly driven by a motor 15 by any suitable means, as a belt or other flexible member, indicated at 16 in Fig. 3.

The drum is indirectly operated or actuated by the interconnection indicated at 17 to the supporting rollers or shafts 18, the shafts 18 together with an idler shaft 19 supporting the drum 4 in such a manner that the drum will be turned in the opposite direction of the threshing shaft 12.

A conveyer 20 is, furthermore, operatively connected, as indicated at 21, so that the upper stretch of this conveyer will operate upwardly as indicated by the arrow 22.

In this manner, if for instance peas are handled in this apparatus, the hulls and waste material are retained in the drum 4 while the comparatively round peas may drop through the apertures 5 from the drum to the conveyer 20 to roll downwardly into a receptacle 23 along the lower edge of the conveyer. Small waste material that may fall from the drum through the perforations is taken upwardly with the conveyer to drop into a receptacle at the rear of the apparatus as indicated at 24. Larger waste material and hulls are discharged from the drum through the drop openings 25 at one end of the drum.

Near the discharging end, the drum is preferably provided with a large screen 26 for the reason that at this point the shells and other waste material have normally become softer and somewhat messy, so that this waste material is liable to retain peas that may have escaped through the several sections to this end of the drum. To avoid a carrying of peas through the discharging drop openings 25, the screen 26 is made of such a wide mesh that peas have a chance to drop out of the drum through this screen 26 while the messy and soft waste material and hulls are not so liable to drop out through this screen in the condition in which such waste material is at this point.

A chute 28 is provided in one end of the housing 27 for feeding material into the housing and through the end wall into the drum 4. The drum is at this end merely provided with a flange-like end 29 to retain the material in the drum. The opposite end of the drum is provided with a closed wall 30 in which the discharging drop openings 25 are arranged From the illustration it will be clear that the threshing arms 11, provided with the threshing plates 31 set at a certain angle, have the tendency to not only hit the material in a circular direction but also to throw the material in an axial direction on account of the peculiar angular setting of the threshing plates 31. Peas, for instance, that are quickly threshed out may drop through the apertures 5 in the first section while the hulls with the peas remaining in the hulls are thrown towards the first partition and further through the angular passages through the partition into the second section of the drum, and after repeated threshing and separating of peas from the hulls through the drum apertures 5, the hulls with the peas still remaining in the hulls are forced from section to section in the drum to be gradually threshed out, cleaned and separated.

One of the principal features of this invention is to provide for a gradual threshing and separating, since the articles handled in a device of this type are, as a rule, comparatively soft and easily mashed or broken which is not desirable. By providing a machine that will hit and thresh the articles not too severely and only gradually from time to time in the several sections it may be expected that peas, for instance, will separate in a clean and whole state and that the hulls and waste material gradually threshed out will discharge at other points provided for that purpose, as set forth above.

Peas handled in the drum are, furthermore, caught by the longitudinal bars 32 whereby such peas are lifted by the rotation of the drum until they fall from such bars practically in the direction and path in which the threshing arms move. In this manner the peas are not unduly hit and still can be hit again and again as the drum bars 32 lift and drop the peas to fall into the path of the threshing plates 31 on the arms 11.

Fresh material is continuously fed into the chute 28 as the material is continuously threshed, cleaned and separated in and discharged from the machine.

Having thus described my invention, I claim:

1. In a hulling apparatus, a drum having a multitude of apertures in its cylindrical periphery and having partitions crosswise to the longitudinal axis of the cylindrical drum, the partitions being provided with cuts tangential to the longitudinal axis, the material of the partitions near said cuts being formed to deflect and guide material handled in the drum from one of the different sections in the drum between the partitions to the next following section.

2. In a hulling apparatus, a housing having feed and discharging openings, supporting rollers horizontally disposed in the housing, a drum rotatably mounted on the rollers with its ends disposed towards the feed and discharging openings in the housing, a threshing mechanism rotatably mounted in the drum, actuating means for rotating the threshing mechanism and the rollers, a conveyer in the housing disposed in an inclined position below the drum and operatively connected to the actuating means, the drum having a multitude of comparatively small apertures in its cylindrical periphery to facilitate a discharging from the drum to the conveyer, and having partitions with deflecting portions adapted to deflect and direct matter from the feed to the discharging end of the drum through the partitions.

In testimony that I claim the foregoing as my invention I have signed my name.

EDWARD J. VAUDREUIL.